(12) United States Patent
Yamabana et al.

(10) Patent No.: US 8,396,171 B2
(45) Date of Patent: Mar. 12, 2013

(54) DATA RECEIVER CIRCUIT

(75) Inventors: Tetsuji Yamabana, Kawasaki (JP); Satoshi Ide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/209,506

(22) Filed: Aug. 15, 2011

(65) Prior Publication Data

US 2011/0293047 A1    Dec. 1, 2011

Related U.S. Application Data (63) Continuation of application No. PCT/JP2009/001136, filed on Mar. 13, 2009.

(51) Int. Cl.
*H04L 27/06* (2006.01)

(52) U.S. Cl. ........ 375/340; 375/343; 375/346; 375/355; 375/359; 375/364; 375/370; 375/372; 375/374; 375/375; 375/376

(58) Field of Classification Search ............ 375/340, 375/343, 346, 347, 355, 364, 370, 372, 374, 375/375, 376; 398/16, 135; 326/38; 327/158
See application file for complete search history.

(56) References Cited

U.S. PATENT DOCUMENTS

| | | |
|---|---|---|
| 5,182,740 A | 1/1993 | Mizokami et al. |
| 5,524,103 A | 6/1996 | Shimizu et al. |
| 6,392,641 B1 | 5/2002 | Nishimura et al. |
| 7,356,076 B2 * | 4/2008 | Xiao et al. ............ 375/219 |
| 7,809,275 B2 * | 10/2010 | Aronson et al. ............ 398/135 |
| 7,965,730 B2 * | 6/2011 | Ryu ............ 370/428 |

FOREIGN PATENT DOCUMENTS

| | | |
|---|---|---|
| JP | 3-274823 | 12/1991 |
| JP | 4-129068 | 4/1992 |
| JP | 10-55161 | 2/1998 |
| JP | 11-74785 | 3/1999 |
| JP | 2000-332720 | 11/2000 |
| JP | 2002-261718 | 9/2002 |
| JP | 2006-41718 | 2/2006 |

OTHER PUBLICATIONS

Japanese Notice of Rejection Ground mailed Nov. 8, 2011 in corresponding Japanese Patent Application No. 2011-503564.
International Search Report for PCT/JP2009/001136, mailed Apr. 7, 2009.

* cited by examiner

*Primary Examiner* — Dhaval Patel
(74) *Attorney, Agent, or Firm* — Staas & Halsey LLP (57) ABSTRACT

A data receiver circuit includes: a clock/data recovery circuit to recover a clock and data from a received signal; a fixed pattern generation circuit to generate fixed pattern data; a first selection circuit to select and output one of the fixed pattern data generated by the fixed pattern generation circuit and recovered data recovered by the clock/data recovery circuit; a second selection circuit to select and output one of a reference clock and recovered clock recovered by the clock/data recovery circuit; and a switching circuit to make the first selection circuit output the fixed pattern data and to make the second selection circuit output the reference clock, when an input signal is lost or the clock/data recovery circuit is in a loss-of-lock state.

7 Claims, 13 Drawing Sheets

DATA RECEIVER CIRCUIT

CROSS-REFERENCE TO RELATED APPLICATION

This application is a continuation of an international application PCT/JP2009/001136, which was filed on Mar. 13, 2009.

FIELD

The embodiments described in this application are related to a data receiver circuit which receives an optical signal.

BACKGROUND

A data receiver circuit which receives data transmitted through a transmission channel recovers data and a clock from a received signal using a clock/data recovery circuit. In data transmission, a phase difference between data and a clock cannot be ignored when, for example, data rate is high and/or a transmission distance is long. Therefore, data and a reference clock (a clock obtained by dividing the frequency of a clock recovered from the data) are outputted to a circuit at the subsequent stage, and the data and the clock are recovered by the clock/data recovery circuit in the circuit at the subsequent stage.

However, in a conventional data receiver circuit, when an input signal is lost or an S/N ratio of the input signal is low, the data receiver circuit outputs data in which 0 or 1 continues. In this case, the clock/data recovery circuit at the subsequent stage can not lock the data. In addition, a clock outside of a prescribed range is outputted. That is to say, such abnormal data in which 0 or 1 continues is outputted from the data receiver circuit, the data receiver circuit at the subsequent stage does not operate normally.

As described above, when the input signal is lost or the clock/data recovery circuit goes into the loss-of-lock state, the conventional data receiver circuit outputs abnormal data in some cases.

As a related art, there has been proposed an optical receiver/amplifier circuit which is configured to generate a signal indicating stop of optical input based on a first stop detection signal indicating the stop of the optical input and a second stop detection signal which is detected in relation to any of the optical receiver/amplifier circuit, a clock recovery circuit, and an optical detector. (For example, Japanese Laid-Open Patent Publication No. 2000-332720)

In addition, as another related art, there has been proposed an optical digital transmission apparatus having a configuration in which a PN pattern generation circuit to generate a PN pattern which is a random pattern having a mark ratio of 1/2 is provided on a receiver side, and the PN pattern is inserted when a low-order group signal is not inputted, whereby the PN pattern is detected by the receiver side. (For example, Japanese Laid-Open Patent Publication No. 2002-261718)

SUMMARY

According to an aspect of an invention, a data receiver circuit includes: a clock/data recovery circuit to recover a clock and data from a received signal; a fixed pattern generation circuit to generate fixed pattern data; a first selection circuit to select and output one of the fixed pattern data generated by the fixed pattern generation circuit and recovered data recovered by the clock/data recovery circuit; a second selection circuit to select and output one of a reference clock and recovered clock recovered by the clock/data recovery circuit; and a switching circuit to make the first selection circuit output the fixed pattern data and to make the second selection circuit output the reference clock, when an input signal is lost or the clock/data recovery circuit is in a loss-of-lock state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
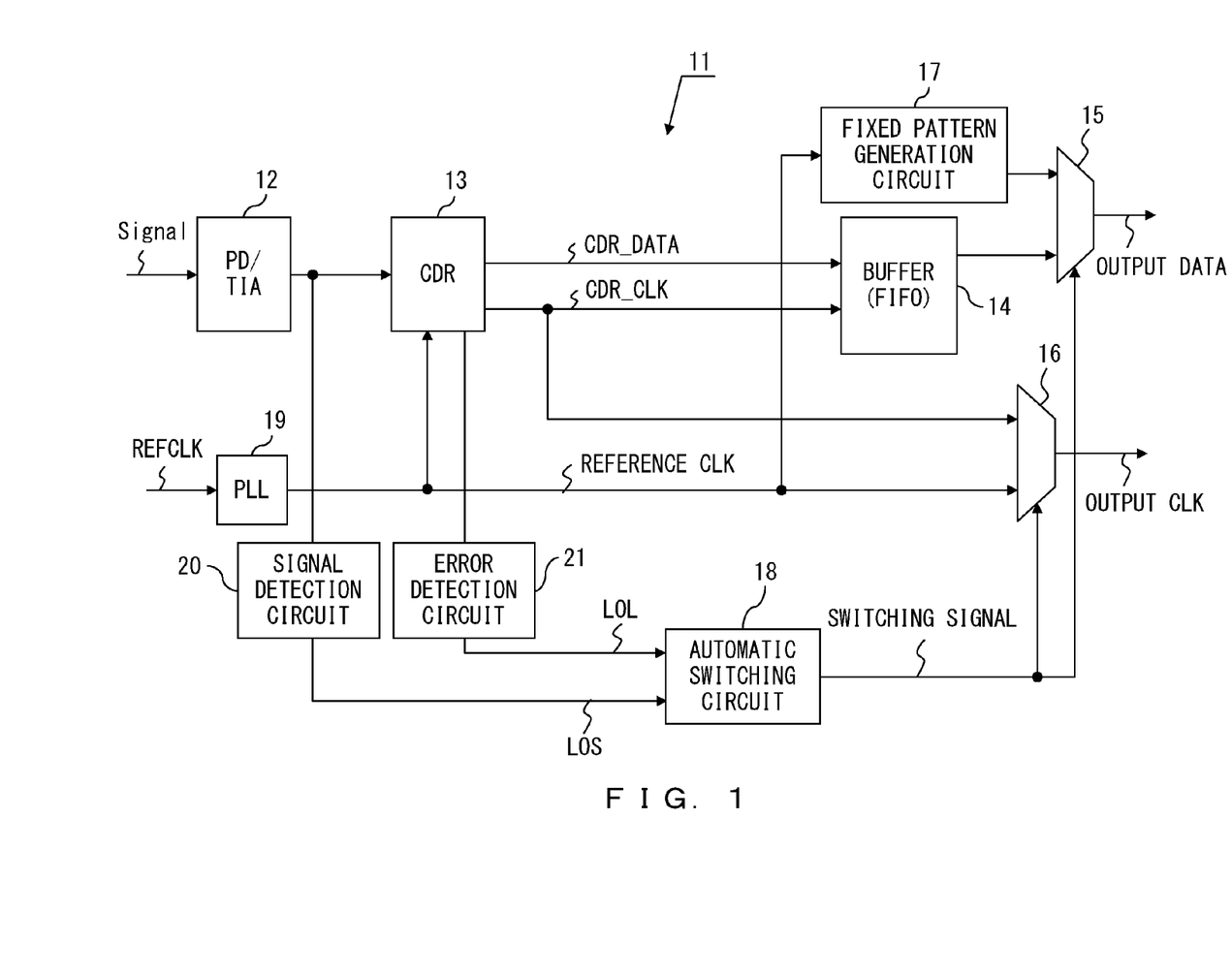
FIG. 1 illustrates a configuration of a data receiver circuit according to a first embodiment.

Hereinafter, embodiments of the present invention are described with reference to the drawings. FIG. 1 illustrates a configuration of a data receiver circuit 11 according to a first embodiment. The first embodiment relates to an optical receiver circuit which receives and amplifies an optical signal to transmit the resultant signal to a transmission channel.

In FIG. 1, a signal conversion/amplification circuit (PD/TIA) 12 converts an input optical signal into an electrical signal and amplifies the electrical signal. The PD/TIA circuit 12 includes a photo diode (PD) which converts the optical signal into the electrical signal and a trans impedance amplifier (TIA) which amplifies the electrical signal.

A clock/data recovery circuit (CDR: Clock Data Recovery) 13 recovers a clock and data from received signal. The clock/data recovery circuit 13 outputs the recovered data (hereinafter, referred to as recovered data CDR_DATA) and the recovered clock (hereinafter, referred to as recovered clock CDR_CLK) to a buffer circuit 14, and outputs the recovered clock CDR_CLK to a second selector 16.

The buffer circuit 14 is a FIFO buffer, and temporarily stores the recovered data CDR_DATA outputted from the clock/data recovery circuit 13. The buffer circuit 14 includes, for example, a plurality of memory circuits (registers and the like) which are cascade-connected to one another, and sequentially stores the recovered data CDR_DATA outputted from the clock/data recovery circuit 13 in the plurality of memory circuits. The recovered data CDR_DATA stored in the buffer circuit 14 is sequentially outputted to a first selector 15.

A fixed pattern generation circuit 17 generates, for example, fixed pattern data having a mark ratio of 1/2. The fixed pattern data is given to the first selector 15. In the fixed pattern data, 0 does not continue to a specified length and 1 does not continue to the specified length.

When the input optical signal is lost, a signal detection circuit 20 outputs a signal-loss detection signal LOS (Loss of Signal). When the clock/data recovery circuit 13 goes into the loss-of-lock state, an error detection circuit 21 outputs a loss-of-lock signal LOL (Loss of Lock). Upon receiving the signal-loss detection signal LOS and/or the loss-of-lock signal LOL, an automatic switching circuit (corresponding to a switching circuit) 18 outputs a switching signal that causes the first selector 15 to select the fixed pattern data and outputs a switching signal that causes the second selector 16 to select a reference clock.

A PLL circuit 19 generates a reference clock (reference CLK) by multiplying the frequency of a source reference clock (REFCLK), and outputs the generated reference clock to the clock/data recovery circuit 13, the second selector 16, and the fixed pattern generation circuit 17. The source reference clock may be generated by an oscillator provided within the data receiver circuit 11.

The first selector (corresponding to a first selection circuit) 15 selects and outputs one of the recovered data CDR_DATA outputted from the buffer circuit 14 and the fixed pattern data outputted from the fixed pattern generation circuit 17 according to the switching signal outputted from the automatic switching circuit 18. The output data of the first selector 15 is referred to as output DATA.

The second selector (corresponding to a second selection circuit) 16 selects and outputs one of the recovered clock CDR_CLK and the reference clock according to the switching signal outputted from the automatic switching circuit 18.

Figure 2:
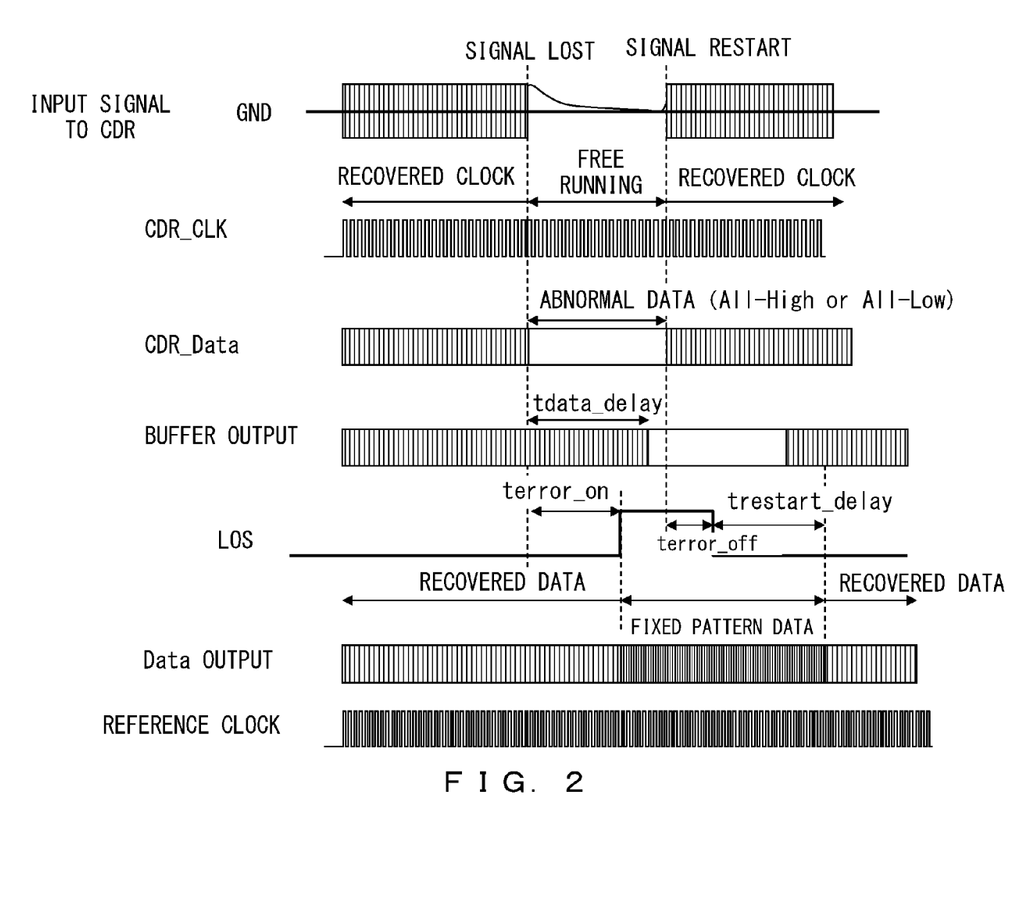
FIG. 2 is a time chart illustrating an operation of the data receiver circuit.

FIG. 2 is a time chart illustrating an operation of the data receiver circuit 11 in FIG. 1. The time chart in FIG. 2 illustrates an example of the case where an input optical signal is lost, the signal-loss detection signal LOS changes from the low level to the high level, and then the input of the optical signal is restarted.

Hereinafter, the operation of the data receiver circuit of FIG. 1 is described with reference to FIG. 2. When the input optical signal is lost, the clock/data recovery circuit 13 does not recover a clock from input signal, and hence a clock having a frequency outside of a prescribed range is outputted from the clock/data recovery circuit 13. In addition, when the input optical signal is lost, abnormal data (for example, data containing only 1 or only 0) is outputted from the clock/data recovery circuit 13.

Abnormal data is outputted from the buffer circuit 14 after a lapse of delay time tdata_delay of the buffer circuit 14 from when the input signal is lost.

As illustrated in FIG. 2, the signal-loss detection signal LOS, which is the output signal of the signal detection circuit 20, changes from the low level to the high level after a lapse of time period terror_on from the timing when the input signal is lost. The terror_on is a time period from the timing when the input signal is lost until the timing when the signal detection circuit 20 actually detects the signal loss. In addition, the signal-loss detection signal LOS changes from the high level to the low level after a lapse of delay time terror_off from the restart of the signal.

When the signal-loss detection signal LOS of FIG. 2 becomes the high level and the state of the switching signal outputted from the automatic switching circuit 18 changes, the first selector 15 selects and outputs the fixed pattern data. Then, after a lapse of delay time trestart_delay from the signal-loss detection signal LOS changes from the high level to the low level due to the restart of the input signal, the first selector 15 selects and outputs the recovered data CDR_DATA.

In addition, when the signal-loss detection signal LOS becomes the high level and the state of the switching signal outputted from the automatic switching circuit 18 changes, the second selector 16 selects and outputs the reference clock. Then, after the lapse of the delay time trestart_delay from the signal-loss detection signal LOS changes from the high level to the low level due the restart of the input signal, the second selector 16 selects and outputs the recovered clock CDR_CLK.

The output data of the first selector 15 and the output clock of the second selector 16 are converted into optical signals by an electro-optical converter (not illustrated) to be transmitted to the transmission channel.

In the above description of the circuit operation, the signal-loss detection signal LOS becomes the high level. Similarly, in the case where the clock/data recovery circuit 13 goes into the loss-of-lock state, the receiver circuit in FIG. 1 outputs the fixed pattern data and the reference clock. Note that also in a case where both of the signal-loss detection signal LOS and the loss-of lock signal LOL become the high level, the operations of the first selector 15 and the second selector 16 are substantially the same as those described above.

When the input optical signal is restarted, the signal-loss detection signal LOS changes from the high level to the low level. Further, when the clock/data recovery circuit 13 restarts the data recovery and goes back to the lock state, the loss-of-lock signal LOL changes from the high level to the low level.

When the signal-loss detection signal LOS becomes the low level and the loss-of-lock signal LOL changes to the low level, the automatic switching circuit 18 outputs the switching signal for switching the operations of the first selector 15 and the second selector 16. Upon receiving this switching signal, the first selector 15 switches the output data thereof from the fixed pattern data to the recovered data CDR_DATA. Similarly, the second selector 16 switches the output clock thereof from the reference clock to the recovered clock CDR_CLK.

According to the data receiver circuit 11, when the input signal is lost (or when the clock/data recovery circuit 13 goes into the loss-of-lock state), the output data is switched to the fixed pattern data. In addition, the output clock is switched to the reference clock which is generated by the PLL circuit 19 provided within the data receiver circuit 11.

Figure 3:
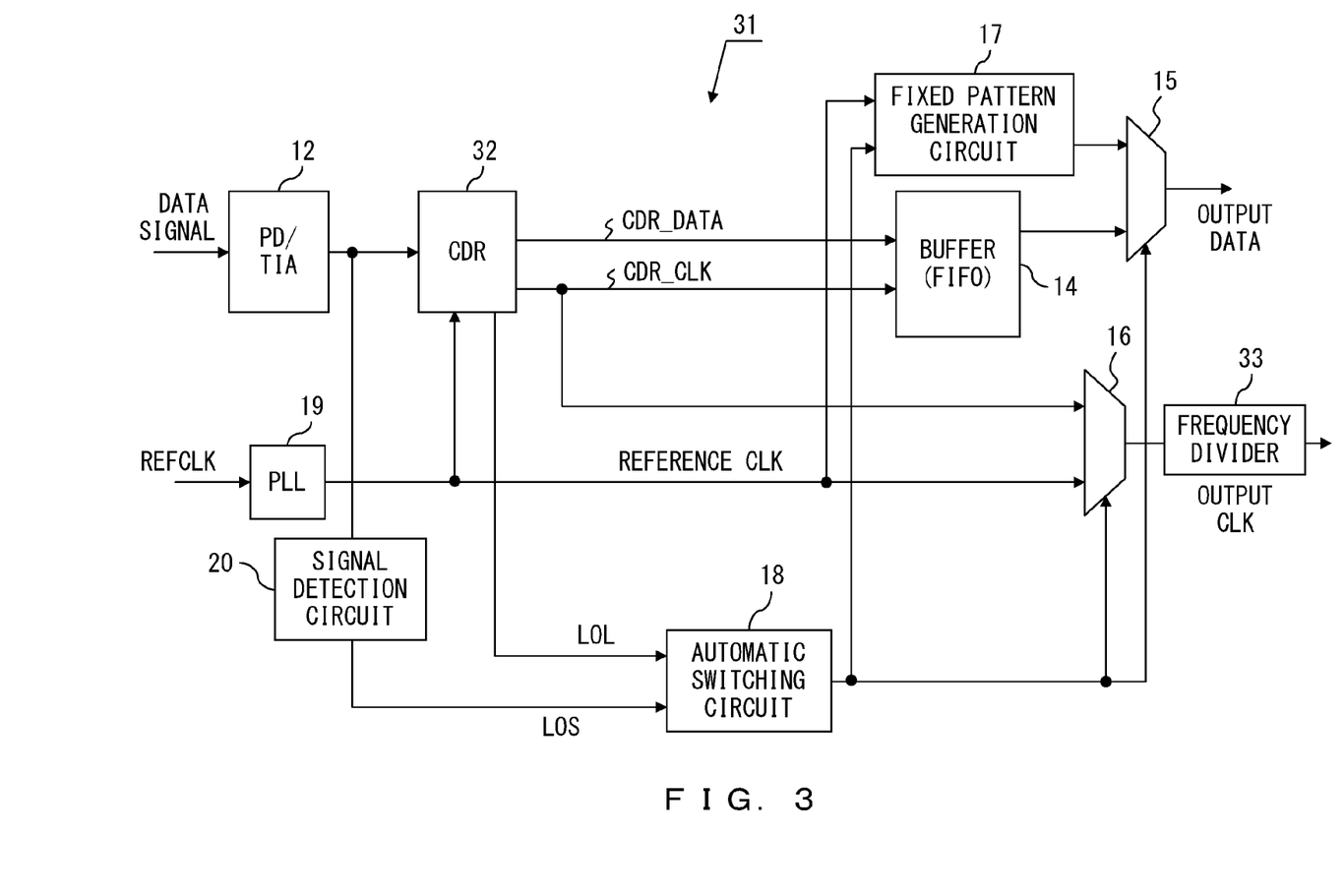
FIG. 3 illustrates a modified example of the first embodiment.

FIG. 3 illustrates a modified example of the first embodiment. A data receiver circuit 31 includes circuit elements which are similar to those of the data receiver circuit 11 in FIG. 1. Hereinafter, the circuit elements which correspond to those in FIG. 1 are denoted by the same reference symbols, and description thereof is omitted.

The data receiver circuit 31 in FIG. 3 is different from the data receiver circuit 11 in FIG. 1 in that the error detection circuit 21 in FIG. 1 is built in a clock/data recovery circuit (CDR) 32. Thus, the loss-of-lock signal LOL is outputted from the clock/data recovery circuit 32 to the automatic switching circuit 18. A frequency divider 33 divides the frequency of the recovered clock CDR_CLK or the reference clock outputted from the second selector 16 to transmit the resultant clock to the transmission channel.

The operation of the data receiver circuit 31 is substantially the same as that of the data receiver circuit 11 in FIG. 11. Accordingly, the data receiver circuit 31 in FIG. 3 provides the same effect as that of the data receiver circuit 11 in FIG. 1.

Figure 4:
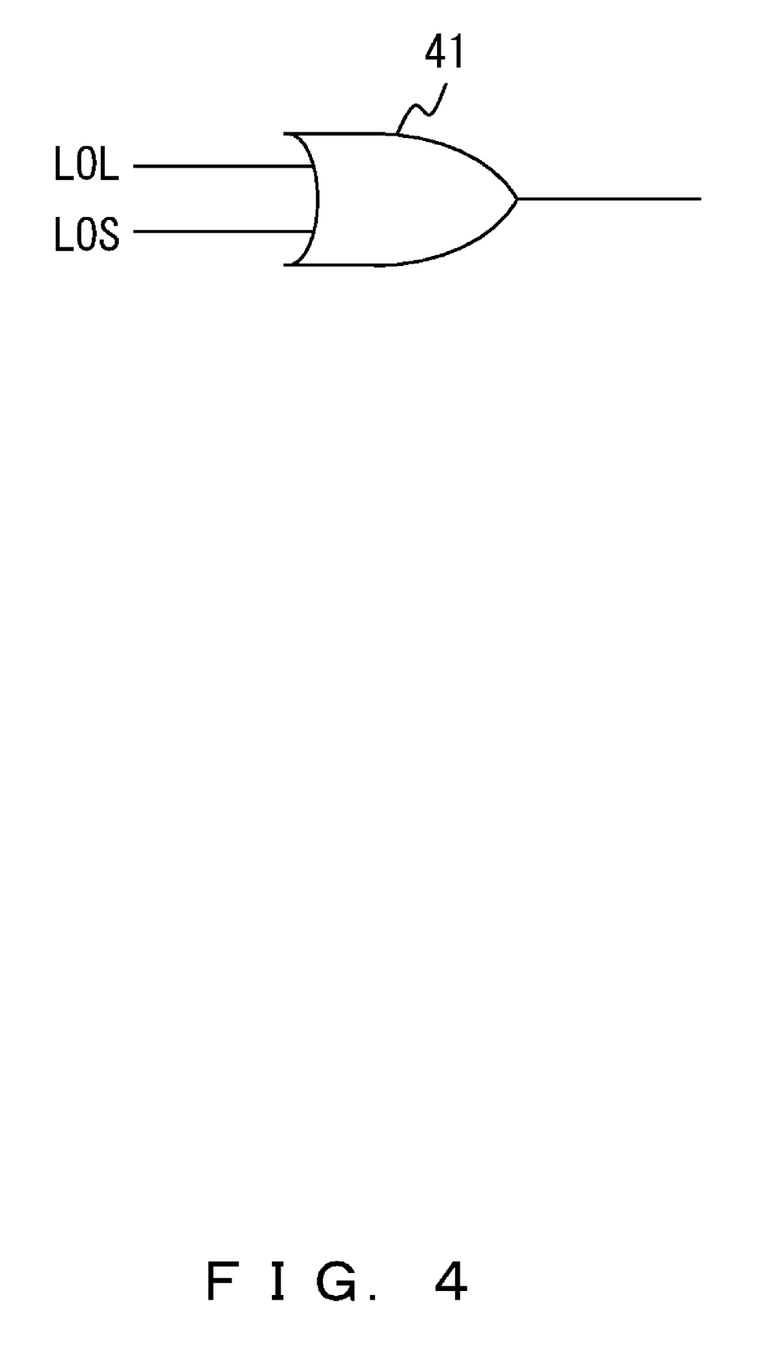
FIG. 4 illustrates an example of an automatic switching circuit.

FIG. 4 illustrates an example of the automatic switching circuit 18. In this example, the automatic switching circuit 18 is realized by an OR circuit 41. When the signal-loss detection signal LOS or the loss-of-lock signal LOL changes from the low level to the high level, the OR circuit 41 outputs high-level signal as the switching signal to each of the first selector 15 and the second selector 16.

Figure 5:
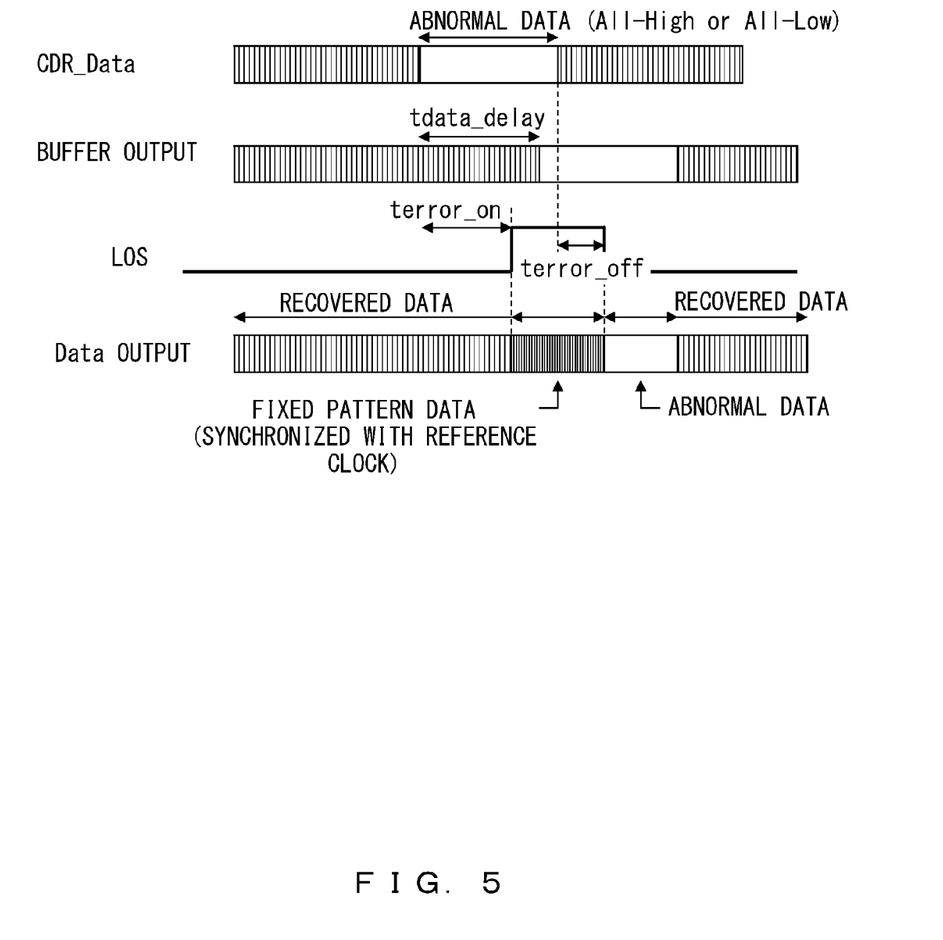
FIG. 5 is a time chart illustrating an operation of the data receiver circuit.

FIG. 5 is a time chart illustrating an operation of the data receiver circuit 11 in the case where the OR circuit 41 is used.

In this example, when the input signal is lost, the clock/data recovery circuit 13 outputs the abnormal data of ALL-High or ALL-Low. The buffer circuit 14 outputs the abnormal data after a lapse of the delay time tdata_delay corresponding to the number of stages of the memory circuits in the buffer circuit 14 since input signal is lost.

The signal-loss detection signal LOS, which is the output signal of the signal detection circuit 20, is normally in the low level, and changes to the high level after a lapse of the time terror_on which is the delay time from when the input signal is lost until when the signal detection circuit 20 detects the loss of the input signal. When the signal-loss detection signal LOS changes from the low level to the high level, the switching signal of the high level is outputted from the OR circuit 41 to each of the first selector 15 and the second selector 16. When the switching signal is the high level, the first selector 15 selects and outputs the fixed pattern data which is the output signal of the fixed pattern generation circuit 17, and the second selector 16 selects and outputs the reference clock.

When the input signal is restarted, the clock/data recovery circuit 13 outputs normal data. The output signal of the signal detection circuit 20 changes from the high level to the low level after a lapse of the time terror_off which is the delay time from when the input signal is restarted until when the signal detection circuit 20 detects normal state of the input signal. When the switching signal, which is the output signal of the OR circuit 41, changes from the high level to the low level, then the first selector 15 selects and outputs the recovered data CDR_DATA which is the output data of the buffer circuit 14, and the second selector 16 selects and outputs the recovered clock CRD_CLK.

In the time chart of FIG. 5, if the output data of the buffer circuit 14 does not return to the normal data before the signal-loss detection signal LOS, which is the output of the signal detection circuit 20, changes from the high level to the low level, the following trouble occurs. In this case, when the signal-loss detection signal LOS changes from the high level to the low level and abnormal data (for example, data in which 1 continues or data in which 0 continues) is outputted from the buffer circuit 14, the first selector 15 selects and outputs this abnormal data.

Figure 6A:
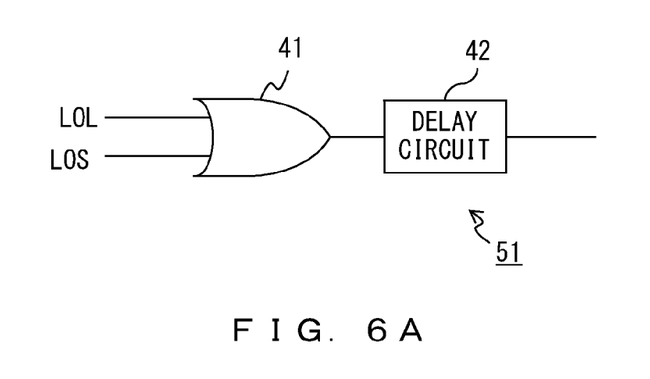
FIG. 6A is a circuit diagram of the automatic switching circuit including a delay circuit.
Figure 6B:
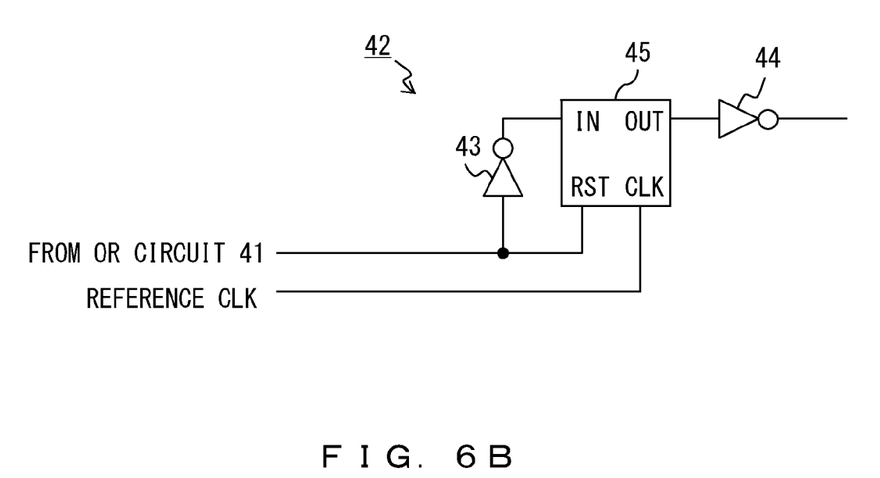
FIG. 6B is a circuit diagram of the delay circuit.

FIG. 6A illustrates an example of an automatic switching circuit 51. The automatic switching circuit 51 includes a delay circuit 42 in order to solve the above-mentioned problem. FIG. 6B is a circuit diagram of the delay circuit 42.

As illustrated in FIG. 6A, the automatic switching circuit 51 includes the OR circuit 41 and the delay circuit 42 connected at output side of the OR circuit 41.

As illustrated in FIG. 6B, the delay circuit 42 includes, for example, two inverters 43 and 44 and a counter 45.

The output signal of the OR circuit 41 is guided to a reset RST terminal of the counter 45, and is also guided to an input IN terminal via the inverter 43. The reference clock signal (reference CLK) is inputted to a clock CLK terminal of the counter 45. The output signal of the counter 45 is guided to each of the first selector 15 and the second selector 16 via the inverter 44.

When the data inputted to the input IN terminal is "1" (for example, high level), the counter 45 counts up in synchronized with the reference clock, and when the count value reaches a specified value, the counter 45 outputs "1".

Here, an operation of the automatic switching circuit 51 is described with reference to time charts of FIG. 7 and FIG. 8. First, a circuit operation when the input optical signal is lost and the signal-loss detection signal LOS (or the loss-of-lock signal LOL) becomes the high level for a certain time period and then returns to the low level is described with reference to FIG. 7.

Figure 7:
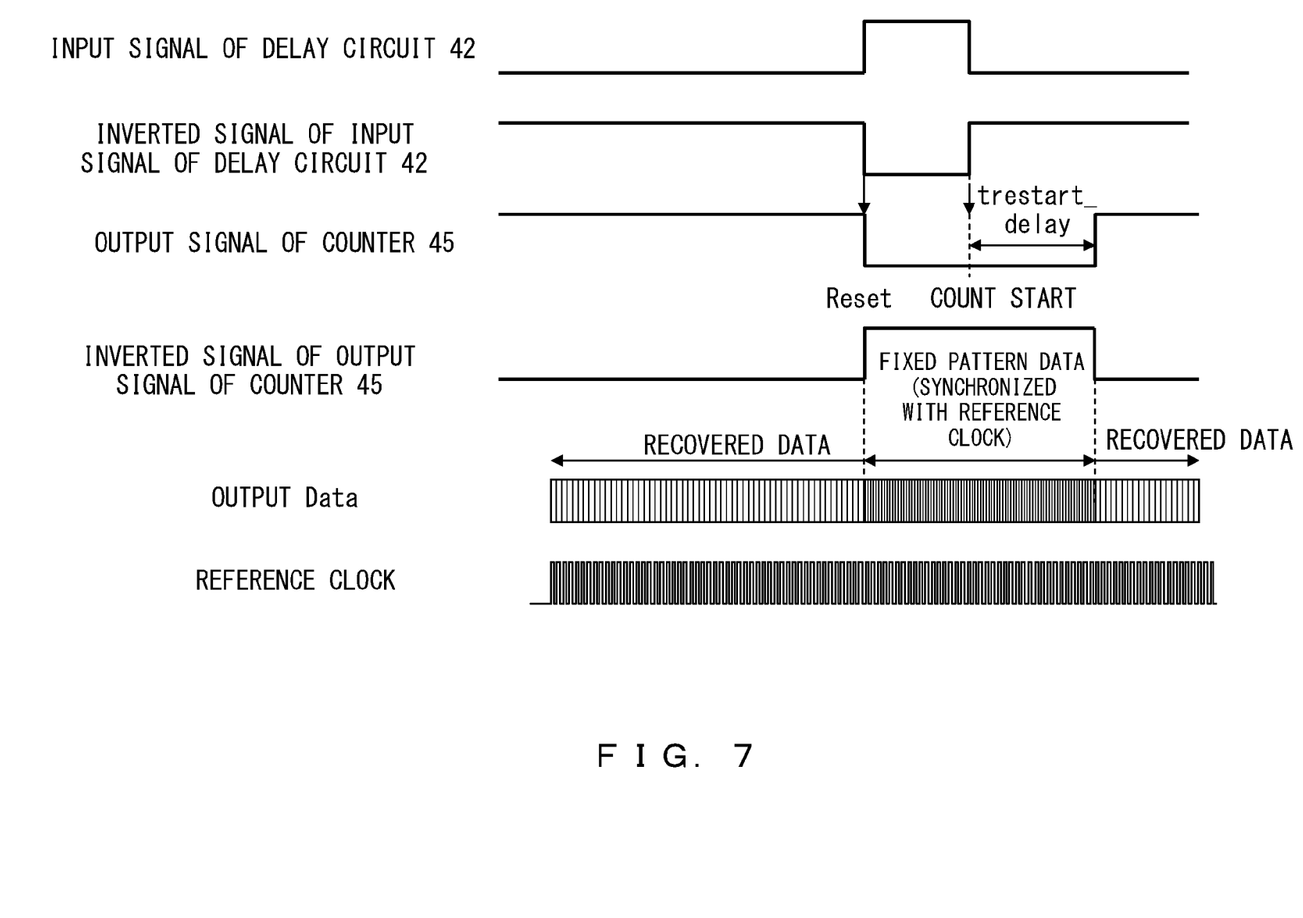
FIG. 7 and FIG. 8 are time charts illustrating an operation of the delay circuit.

For example, when the input optical signal is lost and the signal-loss detection signal LOS changes from the low level to the high level, as illustrated in FIG. 7, the signal from the OR circuit 41 to the delay circuit 42 also changes from the low level to the high level. Since the signal from the OR circuit 41 is fed to the reset RST terminal of the counter 45, the counter 45 is reset by the signal at this timing. Thus, the output signal of the counter 45 is the low level. In addition, since the output signal of the counter 45 is inverted by the inverter 44, when the signal-loss detection signal LOS changes from the low level to the high level, the output signal of the delay circuit 42 becomes the high level.

When the output signal of the delay circuit 42 changes from the low level to the high level, that is, the output of the automatic switching circuit 51 becomes the high level, the first selector 15 selects the output data of the fixed pattern generation circuit 17, and outputs the selected fixed pattern data as the output DATA. In addition, the second selector 16 selects and outputs the reference clock.

After that, when the input optical signal is restarted and the signal-loss detection signal LOS changes from the high level to the low level, as illustrated in FIG. 7, the signal output from the OR circuit 41 to the delay circuit 42 also changes from the high level to the low level. Here, the output signal of the OR circuit 41 is inverted by the inverter 43 before inputted to the input IN terminal of the counter 45. Thus, when the input optical signal is restarted, then the counter 45 starts the count operation. During the counter 45 is performing the count operation, the output signal of the counter 45 maintains the low level.

Here the output signal of the delay circuit 42 is provided to the first selector 15 and the second selector 16 as the switching signal. Accordingly, during this period, the first selector 15 maintains the selection operation to output the fixed pattern data. In addition, the second selector 16 also maintains the selection operation to output the reference clock.

When the count value of the counter 45 reaches a specified value, the output of the counter 45 changes from the low level to the high level, and the output of the delay circuit 42 changes from the high level to the low level. When the output of the delay circuit 42, that is, the output of the automatic switching circuit 51 is the low level, the first selector 15 selects and outputs the recovered data CDR_DATA which is the output data of the buffer circuit 14, and the second selector 16 selects and outputs the recovered clock CDR_CLK.

As described above, since the delay circuit 42 is provided at the output side of the OR circuit 41, the problem that the abnormal data stored in the buffer circuit 14 is outputted when the signal is restarted is solved.

Next, a circuit operation when the signal-loss detection signal LOS (or the loss-of-lock signal LOL) becomes the high level, then becomes the low level, and after that, changes to the high level again is described with reference to FIG. 8.

The operation until the counter 45 starts the count operation due to the loss of the input optical signal is substantially the same as that of FIG. 7, and hence description thereof is omitted.

Figure 8:
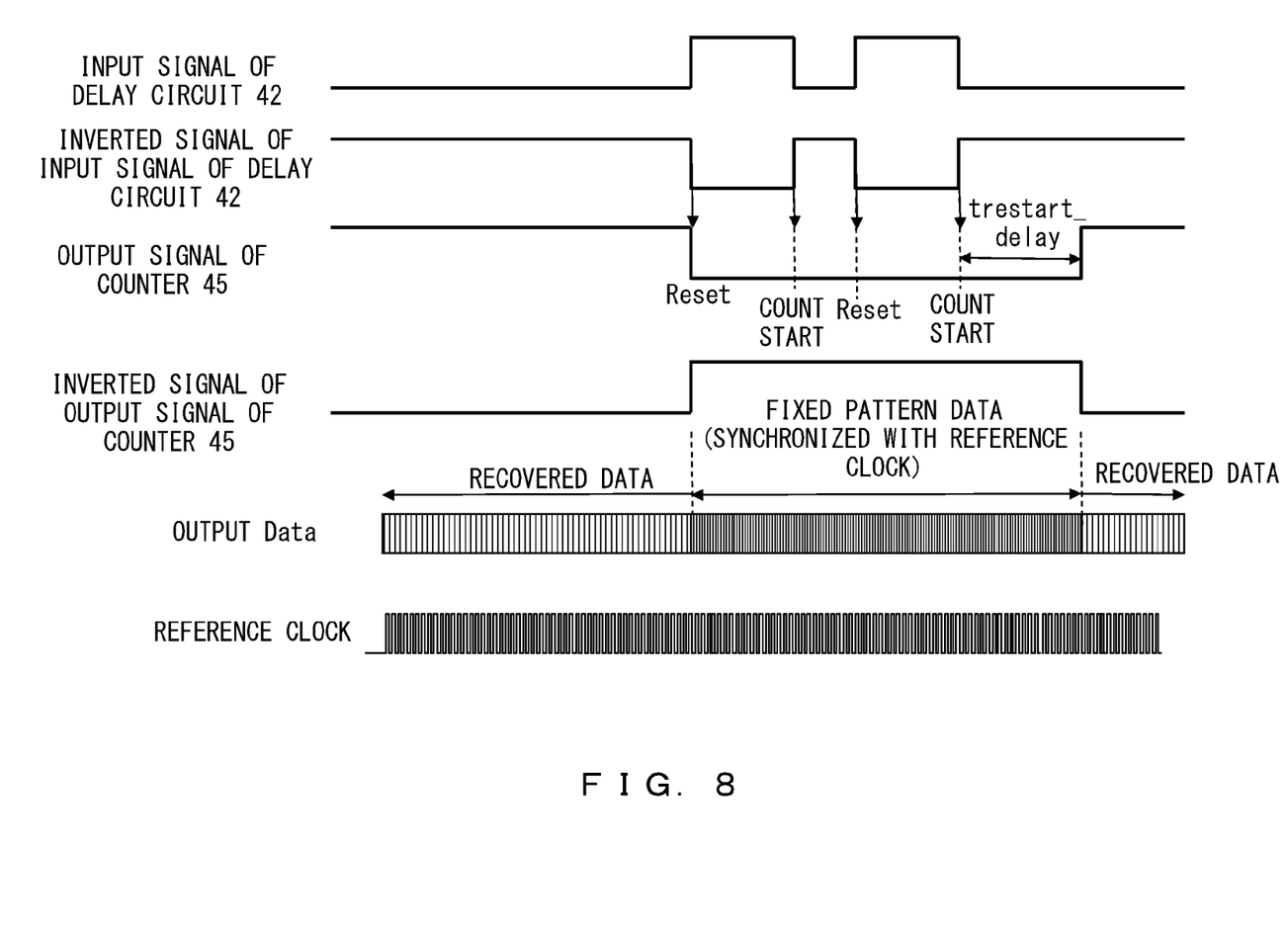

As illustrated in FIG. 8, after the count operation is started, when the signal from the OR circuit 41 to the delay circuit 42 changes from the low level to the high level again, the counter 45 is reset. At this time, the output signal of the counter 45 maintains the low level. After that, when the signal from the OR circuit 41 to the delay circuit 42 changes from the high level to the low level, and the high level signal is given to the input IN terminal of the counter 45 via the inverter 43, the counter 45 starts the count operation. When the count value of the counter 45 reaches the specified value, the output signal of the counter 45 changes from the low level to the high level. The trestart_delay corresponds to the time period from when the counter starts the count operation until when the count value reaches the specified value.

When the output signal of the counter 45 is the high level, that is, the output signal of the automatic switching circuit 51 is the low level, the first selector 15 selects and outputs the recovered data CDR_DATA which is the output data of the buffer circuit 14, the second selector 16 selects and outputs the recovered click CDR_CLK.

As described above, during a period when the input optical signal is lost or the clock/data recovery circuit 13 is in the loss-of-lock state, the fixed pattern data is outputted from the first selector 15, and the internally generated reference clock is outputted from the second selector 16.

Figure 9:
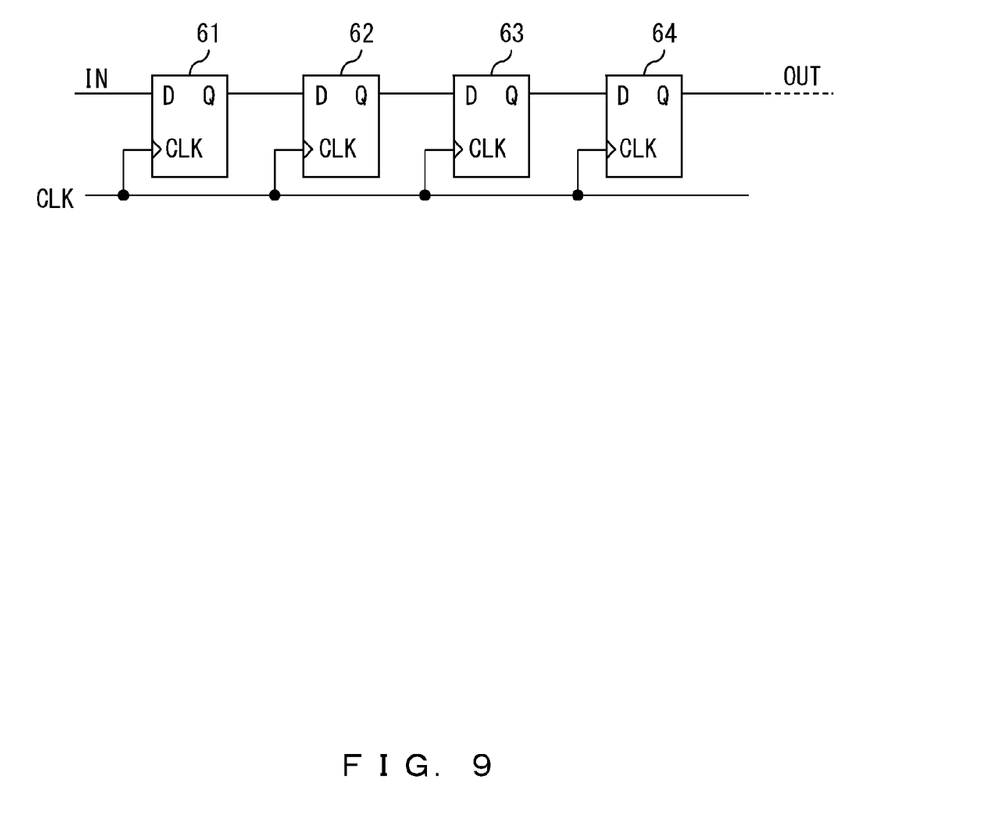
FIG. 9 illustrates an example of a buffer circuit.

FIG. 9 illustrates an example of the buffer circuit 14. In the buffer circuit 14, a plurality of D flip-flops 61 to 64 . . . are cascade-connected to one another. The buffer circuit having a FIFO configuration is realized by cascade-connecting the D flip-flops 61 to 64 . . . to one another.

Figure 10:
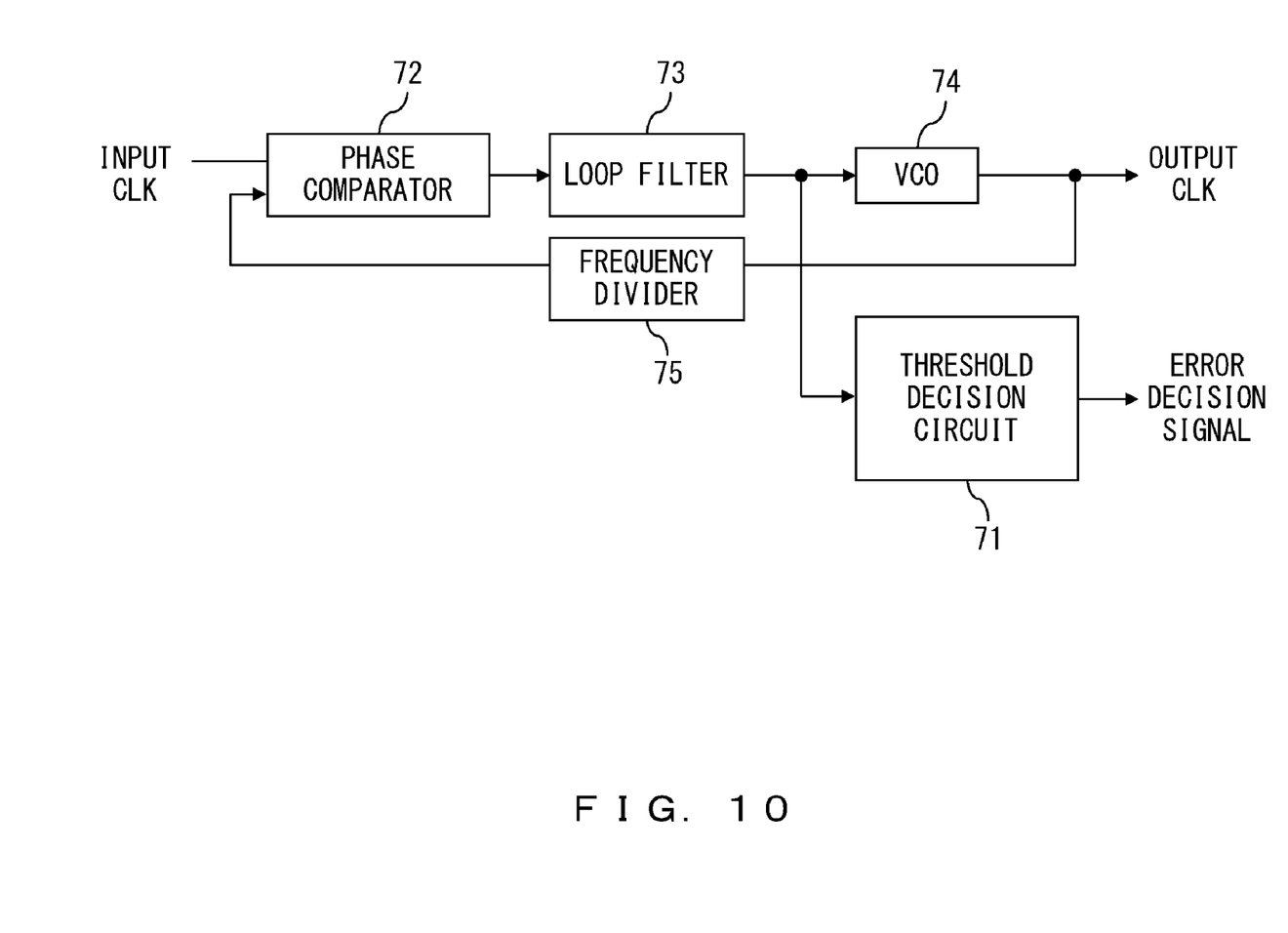
FIG. 10 illustrates an example of an error detection circuit.

FIG. 10 illustrates an example of the error detection circuit 21. The error detection is realized by a threshold decision circuit 71 of the PLL circuit in this example.

The PLL circuit includes a phase comparator 72, a loop filter 73, a voltage controlled oscillator (VCO) 74, a frequency divider 75, and the threshold decision circuit 71.

The threshold decision circuit 71 monitors a control voltage which is outputted from the loop filter 73 to the voltage controlled oscillator 74. In the case where the control voltage falls outside of a given range, the threshold decision circuit 71 determines that lock of the PLL circuit is lost. That is, according to the control voltage given to the voltage controlled oscillator 74, the threshold decision circuit 71 determines whether the current state is the lock state in which the oscillation frequency of the PLL circuit falls within the given range or the loss-of-lock state in which the oscillation frequency thereof does not fall within the given range. The threshold decision circuit 71 is used as the error detection circuit 21, whereby whether or not the clock/data recovery circuit 13 is in the lock state is determined.

According to the first embodiment, when the input optical signal is lost or the clock/data recovery circuit 13 goes into the loss-of-lock state, the first selector 15 selects and outputs the fixed pattern data generated by the fixed pattern generation circuit 17. Therefore, at the time of the signal loss or the loss-of-lock state, abnormal data in which 0 or 1 continues is prevented from being outputted. In addition, when the input optical signal is lost or the clock/data recovery circuit 13 goes into the loss-of-lock state, the second selector 16 selects and outputs the internally generated reference clock instead of the recovered clock CDR_CLK. Thus, the data receiver circuit does not output abnormal clock.

Figure 11:
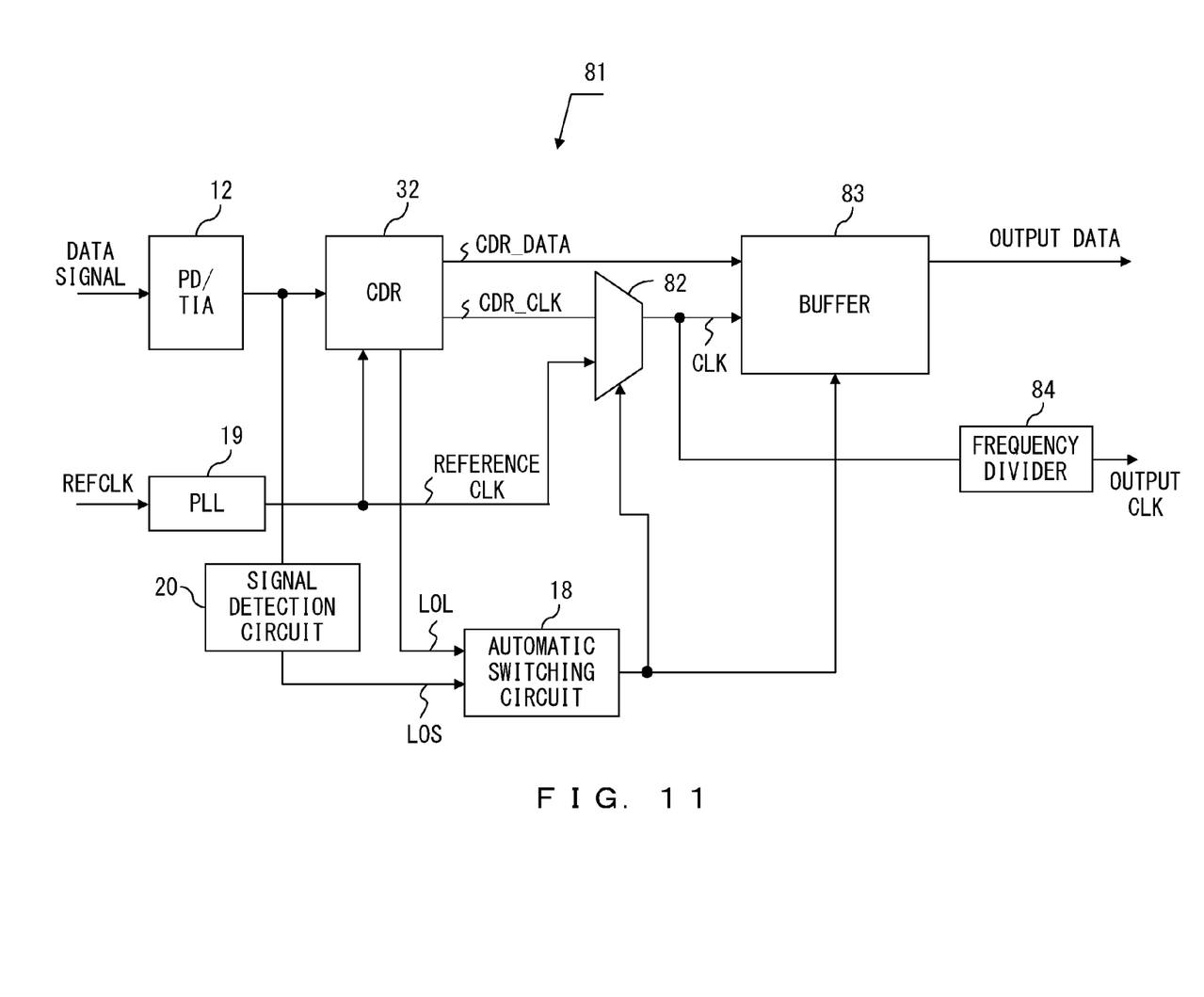
FIG. 11 illustrates a configuration of a data receiver circuit according to a second embodiment.

FIG. 11 is a block diagram of a data receiver circuit 81 according to a second embodiment. The second embodiment has a function to replace the recovered data with the fixed pattern data in the buffer 83. In the following description, elements which are substantially the same as those of FIG. 1 and FIG. 3 are denoted by the same reference symbols, and description thereof is omitted.

In FIG. 11, a selector 82 selects one of the recovered clock CDR_CLK outputted from the clock/data recovery circuit 32 and the reference clock outputted from the PLL circuit 19 and outputs the selected clock to the buffer circuit 83. The selector 82 performs the selection operation based on the switching signal outputted from the automatic switching circuit 18.

The buffer circuit 83 includes a circuit which replaces stored data with the fixed pattern data. In a normal state, the recovered data CDR_DATA outputted from the clock/data recovery circuit 32 is sequentially stored in the plurality of internal memory circuits and sequentially outputted from the memory circuits. At the time of the signal loss or the loss-of-lock state, the stored data are collectively replaced with the fixed pattern data, and the fixed pattern data are sequentially outputted.

A frequency divider 84 divides the frequency of the clock signal outputted from the selector 82 to output the resultant signal.

Figure 12:
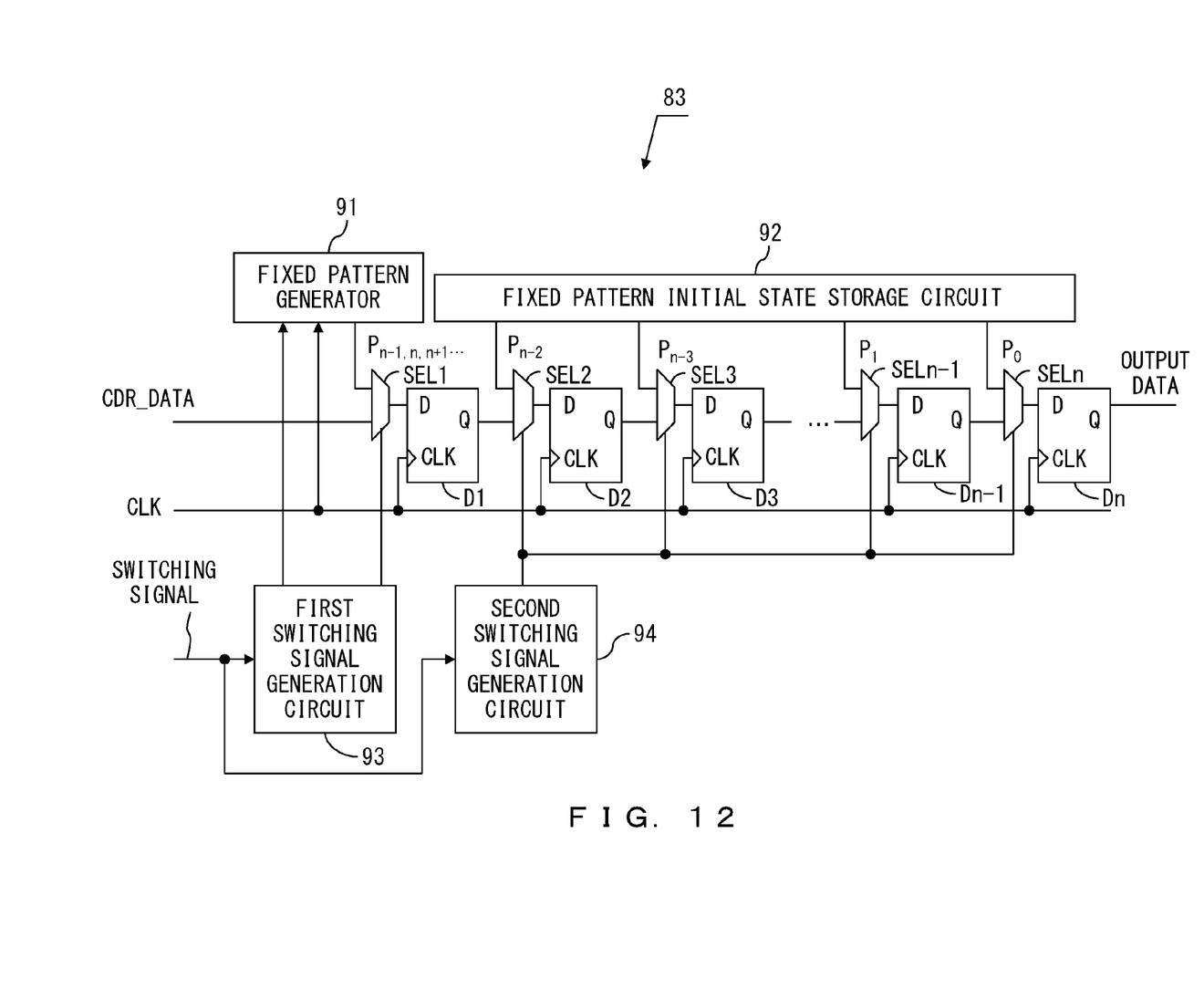
FIG. 12 illustrates an example of a buffer circuit according to the second embodiment.

FIG. 12 illustrates an example of the buffer circuit 83 according to the second embodiment. The buffer circuit 83 includes a fixed pattern generator 91, a fixed pattern initial state storage circuit 92, D flip-flops D1 to Dn, and selectors SEL1 to SELn. In addition, the buffer circuit 83 further includes a first switching signal generation circuit 93 and a second switching signal generation circuit 94. The fixed pattern generator 91 and the fixed pattern initial state storage circuit 92 correspond to the fixed pattern generation circuit.

The selector SEL1 selects one of the fixed pattern data from the fixed pattern generator 91 and the recovered data CDR_DATA from the clock/data recovery circuit 32, and outputs the data to the D flip-flop D1. The selectors SEL2 to SELn select one of the fixed pattern data from the fixed pattern initial state storage circuit 92 and the output data of the previous D flip-flops D1 to Dn−1 and output the selected data to the D flip-flops D2 to Dn, respectively.

The D flip-flops D1 to Dn−1 latch the data outputted from corresponding selectors SEL1 to SELn−1 and output the latched data to the selectors SEL2 to SELn, respectively. The D flip-flop Dn latches the data outputted from the selector SELn and outputs the latched data to the transmission channel.

When the input optical signal is lost or the clock/data recovery circuit 32 goes into the loss-of-lock state, the fixed pattern generator 91 outputs the fixed pattern data $P_{n-1}$, $P_n$, $P_{n+1}$ . . . to the selector SEL1 in synchronization with the clock signal. This click is provided from the selector 82.

The fixed pattern initial state storage circuit 92 stores the fixed pattern data for replacing the data stored in the D flip-flops D2 to Dn immediately after the signal loss or the loss-of-lock state. The fixed pattern initial state storage circuit 92 stores, for example, $P_0$, $P_1$ . . . $P_{n-3}$, $P_{n-2}$ as the fixed pattern data.

The first switching signal generation circuit 93 controls the selector SEL1 provided at the first stage to select the output data of the fixed pattern generator 91 at the time of the signal loss or the loss-of-lock state. The first switching signal generation circuit 93 outputs a first switching signal of the high level during a period of the signal loss or the loss-of-lock state.

The second switching signal generation circuit 94 controls the selectors SEL2 to SELn to select the outputs of the fixed pattern initial state storage circuit 92 at the time of the signal loss or the loss-of-lock state. The second switching signal generation circuit 94 outputs a second switching signal which becomes, for example, the high level at the timing of a change into the signal loss or the loss-of-lock state and then returns to the low level after a specified time period. The first switching signal generation circuit 93 and the second switching signal generation circuit 94 correspond to the switching circuit.

Here, an operation of the buffer circuit 83 is described with reference to a time chart of FIG. 13. When the signal-loss detection signal LOS or the loss-of-lock signal LOL changes from the low level to the high level, the first switching signal generation circuit 93 outputs the first switching signal of the high level during the signal-loss detection signal LOS and/or the loss-of-lock signal LOL is in the high level. At the same time, the second switching signal generation circuit 94 outputs the second switching signal which becomes the high level when the signal-loss detection signal LOS and/or the loss-of-lock signal LOL changes from the low level to the high level and then becomes the low level after specified time period.

Figure 13:
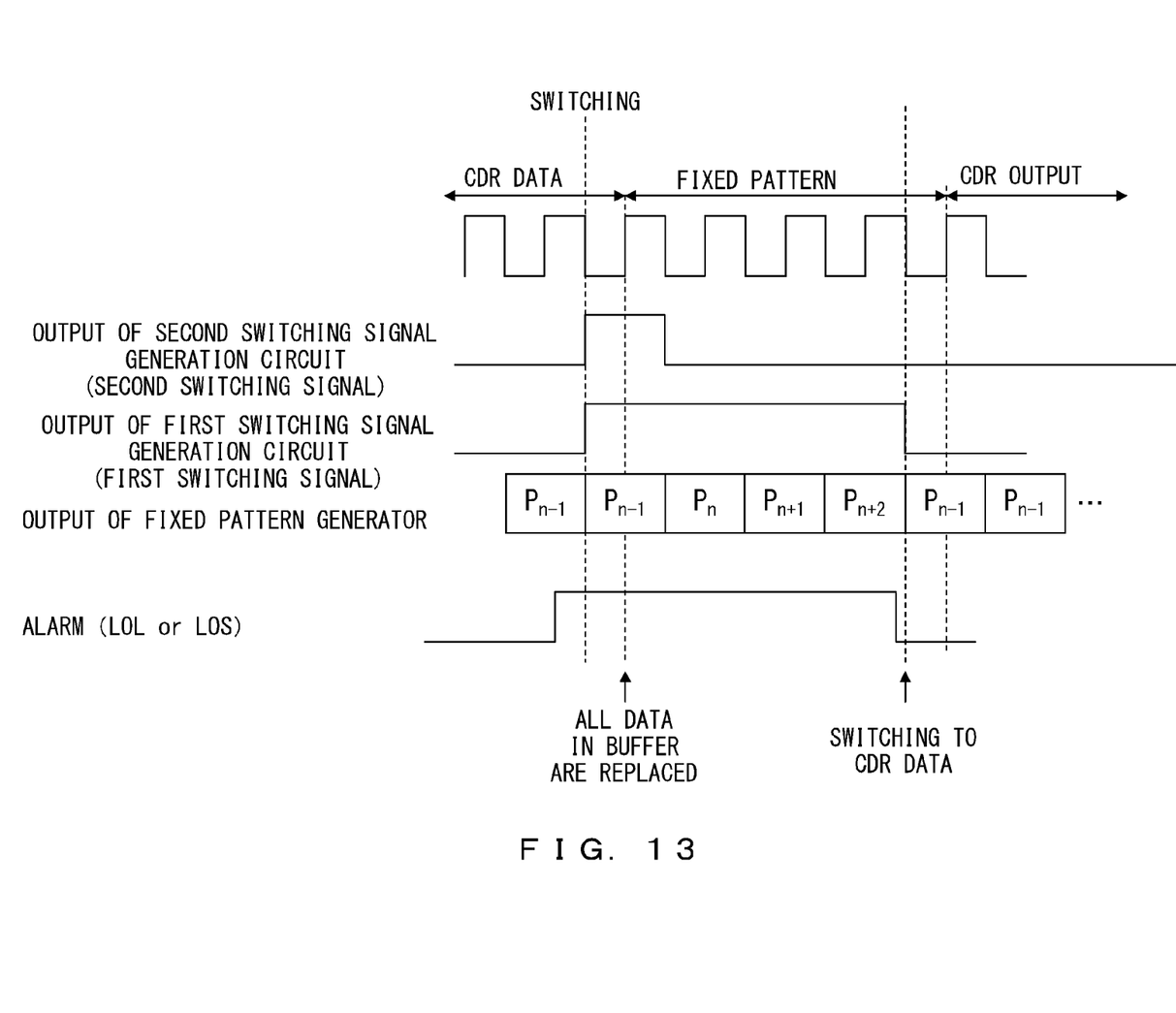
FIG. 13 is a time chart illustrating an operation of the buffer circuit.

As illustrated in FIG. 13, the fixed pattern generator 91 normally outputs the fixed pattern data $P_{n-1}$. When the first switching signal of the high level is given from the first switching signal generation circuit 93, the fixed pattern generator 91 sequentially outputs the fixed pattern data $P_{n-1}$, $P_n$, $P_{n+1}$ . . . to the selector SEL1 during a period when the first switching signal is in the high level. During the period when the first switching signal is in the high level, the selector SEL1 selects the fixed pattern data provided from the fixed pattern generator 91 and outputs the selected data to the D flip-flop D1.

During a period when the second switching signal outputted from the second switching signal generation circuit 94 is in the high level, the selectors SEL2 to SELn select the fixed pattern data $P_{n-2}$ to $P_0$ provided from the fixed pattern initial state storage circuit 92 and output the selected data to the D flip-flops D2 to Dn, respectively. After that, when the second switching signal changes from the high level to the low level, the selectors SEL2 to SELn select Q outputs of the previous D flip-flops D1 to Dn−1 and output the selected signals to the corresponding D flip-flops D2 to Dn, respectively.

That is, at the time of the signal loss or the loss-of-lock state, the fixed pattern data $P_{n-1}$ outputted from the fixed pattern generator 91 and the fixed pattern data $P_{n-2}$ to $P_0$ outputted from the fixed pattern initial state storage circuit 92 are set to the D flip-flops D1 to Dn, respectively. After that, when the second switching signal changes from the high level to the low level, the fixed pattern data $P_{n-1}$, $P_n$, $P_{n+1}$ outputted from the fixed pattern generator 91 are sequentially shifted through the D flip-flops D1 to Dn.

According to the second embodiment, at the time of the signal loss or the loss-of-lock state, the data stored in the D flip-flops D1 to Dn provided in the buffer circuit 83 are replaced with the fixed pattern data. As a result, at the time of the signal loss or the loss-of-lock state, abnormal data or a clock outside of a specified range is prevented from being outputted. Further, the second embodiment does not need the first selector 15 which selects one of the output data of the buffer circuit 14 and the output data of the fixed pattern generation circuit 17.

In addition, since the fixed pattern initial state storage circuit 92 stores the fixed pattern data, the circuit configuration of the fixed pattern generator 91 may be simplified. Specifically, because it is sufficient for the fixed pattern generator 91 to output the fixed pattern data only to the D flip-flop D1 at the first stage, the circuit which generates the fixed pattern data is simplified, and the circuit scale is made smaller.

It should be noted that, in the above-mentioned second embodiment, the fixed pattern initial state storage circuit 92 is provided separately from the fixed pattern generator 91. However, the fixed pattern generator 91 may generate the fixed pattern data to be set to the D flip-flops D2 to Dn.

In this case, there may be provided: a fixed pattern generation circuit which generates fixed pattern data corresponding to a data length of the buffer circuit 83; the selectors SEL1 to SELn; and a switching circuit which controls the fixed pattern generation circuit and the selectors SEL1 to SELn. The automatic switching circuit of FIG. 1 may be used as the switching circuit. In this configuration, the circuit scale of the fixed pattern generator 91 becomes larger, but the fixed pattern initial state storage circuit 92, the first switching signal generation circuit 93, and the second switching signal generation circuit 94 are not necessary.

The present invention is not limited to a data receiver circuit which receives an optical signal to transmit the received signal to a transmission channel, and may be applied to a data receiver circuit which receives data other than the optical signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. A data receiver circuit, comprising:
   a clock/data recovery circuit configured to recover a clock and data from a received signal;
   a fixed pattern generation circuit configured to generate fixed pattern data;
   a first selection circuit configured to select and output one of the fixed pattern data generated by the fixed pattern generation circuit and recovered data recovered by the clock/data recovery circuit;
   a second selection circuit configured to select and output one of a reference clock and recovered clock recovered by the clock/data recovery circuit;
   a switching circuit configured to generate a switching signal to make the first selection circuit output the fixed pattern data and to make the second selection circuit output the reference clock, when an input signal is lost or the clock/data recovery circuit is in a loss-of-lock state; and
   a delay circuit configured to delay an end timing of the switching signal.

2. The data receiver circuit according to claim 1, further comprising a buffer circuit including a plurality of memory circuits configured to sequentially store output data of the clock/data recovery circuit, wherein
   the first selection circuit selects and outputs one of output data of the buffer circuit and the fixed pattern data outputted from the fixed pattern generation circuit.

3. The data receiver circuit according to claim 1, wherein 0 does not continue to a specified length and 1 does not continue to the specified length in the fixed pattern data.

4. A data receiver circuit, comprising:
- a clock/data recovery circuit configured to recover a clock and data from a received signal;
- a fixed pattern generation circuit configured to generate fixed pattern data independent from an input signal of the data receiver circuit;
- a plurality of memory circuits, which are cascade-connected to one another, configured to store the data recovered by the clock/data recovery circuit; and
- a switching circuit configured to replace the data stored in the plurality of memory circuits with the fixed pattern data independent from the input signal of the data receiver circuit outputted from the fixed pattern generation circuit, when an input signal is lost or the clock/data recovery circuit is in a loss-of-lock state.

5. The data receiver circuit according to claim 4, wherein the fixed pattern generation circuit includes:
- a fixed pattern generator configured to sequentially supply the fixed pattern data to a memory circuit at a first stage of the plurality of memory circuits; and
- a fixed pattern data storage circuit configured to store the fixed pattern data to be set to at least a part of the plurality of memory circuits.

6. The data receiver circuit according to claim 5, further comprising:
- a first selector configured to select one of the fixed pattern data outputted from the fixed pattern generator and the data recovered by the clock/data recovery circuit, and to output the selected data to the memory circuit at the first stage of the plurality of memory circuits; and
- a plurality of second selectors configured to select one of the fixed pattern data outputted from the fixed pattern data storage circuit and output data of memory circuits at previous stages, and to output the selected data to memory circuits at subsequent stages, respectively.

7. The data receiver circuit according to claim 6, further comprising:
- a first switching signal generation circuit configured to generate a first switching signal that makes the first selector select the fixed pattern data outputted from the fixed pattern generator, when the input signal is lost or the clock/data recovery circuit is in a loss-of-lock state; and
- a second switching signal generation circuit configured to generate a second switching signal that respectively makes the second selectors select the fixed pattern data outputted from the fixed pattern data storage circuit, when the input signal is lost or the clock/data recovery circuit is in a loss-of-lock state.

* * * * *